(12) United States Patent
Hardy et al.

(10) Patent No.: US 9,938,398 B2
(45) Date of Patent: Apr. 10, 2018

(54) RUBBER COMPOSITION

(71) Applicant: ARLANXEO Deutschland GmbH, Dormagen (DE)

(72) Inventors: David John Hardy, Leiderdorp (NL); Heike Kloppenburg, Duesseldorf (DE); Alex Lucassen, Sassveld (NL); Norbert Steinhauser, Dormagen (DE); Yan Zhang, Leverkusen (DE)

(73) Assignee: ARLANXEO Deutschland GmbH, Dormagen (DE)

( * ) Notice: Subject to any disclaimer, the term of this patent is extended or adjusted under 35 U.S.C. 154(b) by 148 days.

(21) Appl. No.: 15/031,391

(22) PCT Filed: Oct. 23, 2014

(86) PCT No.: PCT/EP2014/072778
§ 371 (c)(1),
(2) Date: Apr. 22, 2016

(87) PCT Pub. No.: WO2015/059237
PCT Pub. Date: Apr. 30, 2015

(65) Prior Publication Data
US 2016/0237259 A1    Aug. 18, 2016

(30) Foreign Application Priority Data
Oct. 24, 2013    (EP) .................................... 13190166

(51) Int. Cl.
C08L 15/00  (2006.01)
B60C 1/00   (2006.01)
C08C 19/20  (2006.01)
C08L 9/00   (2006.01)

(52) U.S. Cl.
CPC ................ *C08L 15/00* (2013.01); *B60C 1/00* (2013.01); *C08C 19/20* (2013.01); *C08L 9/00* (2013.01); *C08L 2205/02* (2013.01); *C08L 2205/06* (2013.01)

(58) Field of Classification Search
CPC ..................................................... C08L 15/00
USPC ......................................................... 523/156
See application file for complete search history.

(56) References Cited

U.S. PATENT DOCUMENTS

| 3,244,664 | A | 4/1966 | Zelinski et al. |
| 3,773,732 | A | 11/1973 | Dillenschneider |
| 4,185,042 | A | 1/1980 | Verkouw |
| 4,260,707 | A | 4/1981 | Sylvester et al. |
| 4,417,029 | A | 11/1983 | Milkovich |
| 4,616,089 | A | 10/1986 | Jacobs et al. |
| 5,416,168 | A | 5/1995 | Willis et al. |
| 5,625,017 | A | 4/1997 | Morita et al. |
| 5,665,829 | A | 9/1997 | Shepherd et al. |
| 5,684,171 | A | 11/1997 | Wideman et al. |
| 5,684,172 | A | 11/1997 | Wideman et al. |
| 5,792,820 | A | 8/1998 | Lawson et al. |
| 5,852,099 | A | 12/1998 | Vanel |
| 5,900,449 | A | 5/1999 | Custodero et al. |
| 6,013,718 | A | 1/2000 | Cahioch et al. |
| 6,025,450 | A | 2/2000 | Lawson et al. |
| 6,333,375 | B1 | 12/2001 | Nakamura et al. |
| 6,344,524 | B1 | 2/2002 | Robert et al. |
| 6,365,668 | B1 | 4/2002 | Scholl et al. |
| 6,383,971 | B1 | 5/2002 | Windisch |
| 6,399,726 | B1 | 6/2002 | Windisch et al. |
| 6,576,731 | B2 | 6/2003 | Steinhauser et al. |
| 8,445,580 | B2 | 5/2013 | Zhao |
| 9,587,059 | B2 | 3/2017 | Steinhauser |
| 2008/0308204 | A1 | 12/2008 | Hogan et al. |
| 2009/0156751 | A1 | 6/2009 | Kwag et al. |
| 2010/0186859 | A1 | 7/2010 | Zhao et al. |
| 2011/0136956 | A1 | 6/2011 | Kwag et al. |
| 2011/0282001 | A1 | 11/2011 | Steinhauser et al. |
| 2012/0024441 | A1 | 2/2012 | Ryba et al. |
| 2012/0029114 | A1* | 2/2012 | Francik .................. C08L 15/00 523/156 |
| 2012/0041129 | A1 | 2/2012 | Steinhauser et al. |
| 2012/0309891 | A1 | 12/2012 | Zhao |
| 2013/0281609 | A1 | 10/2013 | Steinhauser et al. |
| 2013/0340909 | A1 | 12/2013 | Zhao |

(Continued)

FOREIGN PATENT DOCUMENTS

| DE | 2653144 A1 | 5/1978 |
| EP | 10011184 B1 | 5/1983 |

(Continued)

OTHER PUBLICATIONS

Hsieh, Henry L. et al., Anionic Polymerization, Principles and Practical Applications, Marcel Dekker Inc. New York-Basle 1996, pp. 447-469.
Witte, J., Ionisch initiierte Polymerisation von Monomeren mit C C-Doppelbindungen, Houben-Weyl, Methoden der Organischen Chemie [Methods of Organic Chemistry], Thieme Verlag, Stuttgart, 1987, vol. E 20, pp. 114-134.
Ullmann's Encyclopedia of Industrial Chemistry, vol. A 23, Rubber 3. Synthetic, VCH Verlagsgesellschaft mbH, D-69451 Weinheim, 1993, pp. 240-364.

(Continued)

*Primary Examiner* — Doris L Lee

(57) ABSTRACT

The invention relates to vulcanizable rubber compositions comprising at least the following components:
a) at least one functionalized polymer,
b) at least one modified polybutadiene having a proportion of cis-1,4 units of >95% by weight and a proportion of 1,2-vinyl content of <1% by weight, the polybutadiene having been modified by means of sulphur chlorides after the polymerization,
c) at least one silica,
d) at least one further filler,
e) at least one vulcanizing agent,
f) at least one oil and
g) optionally at least one further rubber additive.

14 Claims, 4 Drawing Sheets

(56) References Cited

U.S. PATENT DOCUMENTS

2015/0252126 A1* 9/2015 Kloppenburg .......... C08C 19/00
                                                     525/313
2016/0280815 A1* 9/2016 Kloppenburg .......... C08C 19/08

FOREIGN PATENT DOCUMENTS

EP          0127236 B1    7/1987
JP        56104906 A2     8/1981

OTHER PUBLICATIONS

Ullmann's Encyclopedia of Industrial Chemistry, VCH Verlagsgesellschaft mbH, D-69451 Weinheim, 1993, "Silica", pp. 635-647.
Ullmann's Encyclopedia of Industrial Chemistry, VCH Verlagsgesellschaft mbH, D-69451 Weinheim, 1993, vol A 23 "Chemicals and Additives", pp. 366-417.
European Search Report from European Application No. 13190166, dated Apr. 10, 2014, three pages.

* cited by examiner

2nd heating curve in the DSC measurement for determination of the glass transition temperature Graph of stiffness index (SI) and rolling resistance index (RRI)

Garvey die profiles of the extrudates formed from vulcanizates from Examples 1-4 (numbering according to Table 6) produced at 100°C Garvey die profiles of the extrudates formed from vulcanizates from Examples 1-4 (numbering according to Table 6 in the examples) produced at 120°C Garvey die profiles of the extrudates formed from Examples 7 and 8 (numbering according to Table 6)

Further examples of Garvey profiles at 100°C    at 120°C

PBR 4078 / CB 24

PBR 4078 / PBR 4065

RUBBER COMPOSITION

The invention relates to vulcanizable rubber compositions and to vulcanizates produced therefrom, which are suitable for the production of tyres, tyre treads or tyre components.

Important properties desirable in tyres and tyre treads include good adhesion on dry and wet surfaces, low rolling resistance and high abrasion resistance. It is very difficult to improve the skid resistance of a tyre without simultaneously worsening the rolling resistance and abrasion resistance. A low rolling resistance is important for low fuel consumption, and high abrasion resistance is the crucial factor for a long service life of the tyre.

Wet skid resistance and rolling resistance of a tyre tread depend largely on the dynamic/mechanical properties of the rubbers which are used in the blend production. To lower the rolling resistance, rubbers with a high rebound resilience at higher temperatures (60° C. to 100° C.) are used for the tyre tread. On the other hand, for improving the wet skid resistance, rubbers having a high damping factor at low temperatures (0 to 23° C.) or low rebound resilience in the range of 0° C. to 23° C. are advantageous. In order to fulfill this complex profile of requirements, mixtures of various rubbers are used in the tread. Usually, mixtures of one or more rubbers having a relatively high glass transition temperature, such as styrene-butadiene rubber, and one or more rubbers having a relatively low glass transition temperature, such as polybutadiene having a high 1,4-cis content or a styrene-butadiene rubber having a low styrene and low vinyl content or a polybutadiene prepared in solution and having a moderate 1,4-cis and low vinyl content, are used.

Anionically polymerized solution rubbers containing double bonds, such as solution polybutadiene and solution styrene-butadiene rubbers, have advantages over corresponding emulsion rubbers in terms of production of tyre treads with low rolling resistance. The advantages lie, inter alia, in the controllability of the vinyl content and of the associated glass transition temperature and molecular branching. In practical use, these give rise to particular advantages in the relationship between wet skid resistance and rolling resistance of the tyre. Important contributions to energy dissipation and hence to rolling resistance in tyre treads result from free ends of the polymer chains and from the reversible buildup and degradation of the filler network formed by the filler used in the tyre tread mixture (usually silica and/or carbon black).

For production of tyres or tyre treads with reduced rolling resistance, it is customary to use fillers as reinforcing agents, for instance polysulphidic silanes, carbon blacks or silica. However, a disadvantage of the use of functionalized solution styrene-butadiene rubbers and silica as reinforcing agents for production of tyres, tyre treads or tyre components is that the rubber mixture becomes very elastic because of elevated polymer-filler interaction accompanied by reduced filler-filler interaction, which is a problem for the processibility of the rubber mixture during extrusion or calendering. More particularly, this effect is manifested in the rough surface structure of the vulcanizates. The result of this is that weight control becomes more difficult in the manufacturing process.

It has been suggested that the processibility of silica-containing rubber mixtures be improved, for example, with additional substances such as fatty acid esters, fatty acid salts, and mineral oils. The additional substances mentioned have the disadvantage of that, although they increase flowability, they greatly reduce moduli at relatively high elongation (e.g. from 100% to 300%) or the hardness of the vulcanizates, thus impairing the reinforcing effect of the filler. However, too low a hardness or stiffness of the vulcanizate results in unsatisfactory driving characteristics of the tyre, particularly on bends.

It is therefore an object of the invention to provide vulcanizable rubber compositions having good processing characteristics in the production of tyres, tyre treads or tyre components, without impairment of the dynamic/mechanical properties of the tyres, tyre treads or tyre components, especially with regard to rolling resistance, wet skid resistance and/or mechanical strength.

It has been found that, surprisingly, this aim is achieved with vulcanizable rubber compositions comprising at least the following components:
a) at least one functionalized polymer,
b) at least one modified polybutadiene having a proportion of cis-1,4 units of >95% by weight and a 1,2-vinyl content of <1% by weight, the polybutadiene having been modified by means of sulphur chlorides after the polymerization,
c) at least one silica,
d) at least one further filler,
e) at least one vulcanizing agent,
f) at least one oil and
g) optionally at least one further rubber additive.

Figure 1:
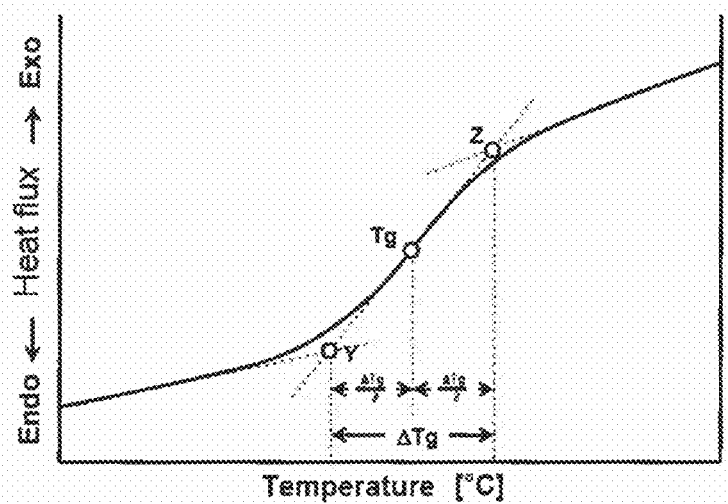
FIG. 1 shows the graph evaluation of the thermogram of the 2nd heating operation by drawing three straight lines to determine the glass transition temperature of the rubbers. The glass transition temperature Tg is obtained as the midpoint temperature of the points of intersection Y and Z. The experimental procedure for the DSC method is described in detail later in this application.

It has been found that the addition of modified polybutadienes (component b) has a positive effect on the flowability of rubber compositions and leads to the vulcanizates having good dynamic characteristics and a distinct increase in hardness/stiffness, which is particularly important in the processibility of tyres, tyre treads or tyre components.

Component a):

Preferably, the functionalized polymer comprises functionalized diene polymers, or diene copolymers obtainable by copolymerization of dienes with vinylaromatic monomers. More preferably, the functionalized polymer is a polybutadiene, a polyisoprene, a butadiene-isoprene copolymer, a butadiene-styrene copolymer (SSBR), an isoprene-styrene copolymer or a butadiene-isoprene-styrene terpolymer.

If the functionalized polymer used as component a) is a modified polybutadiene, this must be different from component b).

Especially preferably, at least one butadiene-styrene copolymer (SSBR) is used as component a). SSBR is understood to mean rubbers which are produced in a solution process based on vinylaromatics and dienes, preferably conjugated dienes (H. L. Hsieh, R. P. Quirk, Marcel Dekker Inc. New York-Basle 1996, p. 447-469; Houben-Weyl, Methoden der Organischen Chemie [Methods of Organic Chemistry], Thieme Verlag, Stuttgart, 1987, volume E 20, pages 114 to 134; Ullmann's Encyclopedia of Industrial Chemistry, Vol. A 23, Rubber 3. Synthetic, VCH Verlagsgesellschaft mbH, D-69451 Weinheim, 1993, p. 240-364).

Suitable vinylaromatic monomers are styrene, o-, m- and p-methylstyrene, technical methylstyrene mixtures, p-tert-butylstyrene, α-methylstyrene, p-methoxystyrene, vinylnaphthalene, divinylbenzene, trivinylbenzene and divinylnaphthalene. Preference is given to styrene. The content of polymerized vinylaromatic is preferably in the range of 5 to 50% by weight, more preferably in the range of 10 to 40% by weight. Suitable diolefins are 1,3-butadiene, isoprene, 1,3-pentadiene, 2,3-dimethylbutadiene, 1-phenyl-1,3-butadiene and 1,3-hexadiene. Preference is given to 1,3-butadiene and isoprene. The content of polymerized dienes is in the range of 50 to 95% by weight, preferably in the range of 60 to 90% by weight. The content of vinyl groups in the polymerized diene is in the range of 10 to 90%, the content of 1,4-trans double bonds is in the range of 10 to 80% and the content of 1,4-cis double bonds is complementary to the sum of vinyl groups and 1,4-trans double bonds. The vinyl content of the SSBR is preferably >10%.

The polymerized monomers and the different diene configurations are typically distributed randomly in the polymer.

These vinylaromatic/diene rubbers are produced as rubber component a) for the inventive rubber mixtures especially by anionic solution polymerization, i.e. by means of an alkali metal- or alkaline earth metal-based catalyst in an organic solvent.

The solution-polymerized vinylaromatic/diene rubbers have Mooney viscosities (ML 1+4 at 100° C.) in the range of 20 to 150 Mooney units (MU), preferably in the range of 30 to 100 Mooney units. Especially the high molecular weight SSBR types having Mooney viscosities of >80 MU may contain oils in amounts of 30 to 100 parts by weight based on 100 parts by weight of rubber. Oil-free SSBR rubbers have glass transition temperatures in the range of −70° C. to −10° C., determined by differential thermoanalysis (DSC).

SSBR may be either linear or branched, or have end group modification. For example, such types are specified in DE 2 034 989 C2 and JP-A-56-104 906. The branching agent used is preferably silicon tetrachloride or tin tetrachloride.

The introduction of functional groups at the ends of the polymer chains and/or starts of the polymer chains enables physical or chemical attachment of these ends and/or starts of the polymer chains to the filler surface. This restricts the mobility thereof and hence reduces energy dissipation under dynamic stress on the tyre tread. At the same time, these functional groups can improve the dispersion of the filler in the tyre tread, which can lead to a weakening of the filler network and hence to further lowering of the rolling resistance.

For this purpose, numerous methods for end group modification have been developed. For example, EP0180141A1 describes the use of 4,4'-bis(dimethylamino)benzophenone or N-methylcaprolactam as functionalizing reagents. The use of ethylene oxide and N-vinylpyrrolidone is also known from EP0864606A1. A number of further possible functionalizing reagents are detailed in U.S. Pat. No. 4,417,029. Methods for introducing functional groups at the start of the polymer chains by means of functional anionic polymerization initiators are described, for example, in EP0513217A1 and EP0675140A1 (initiators with a protected hydroxyl group), US20080308204A1 (thioether-containing initiators) and in U.S. Pat. No. 5,792,820, EP0590490A1 and EP0594107A1 (alkali metal amides of secondary amines as polymerization initiators).

The carboxyl group, as a strongly polar, bidentate ligand, can interact particularly well with the surface of the silica filler in the rubber mixture. Methods for introducing carboxyl groups along the polymer chain of diene rubbers prepared in solution are known and are described, for example, in DE2653144A1, EP1000971A1, EP1050545A1, WO2009034001A1.

The introduction of carboxyl groups at the chain ends of diene rubbers has likewise been described, for example in U.S. Pat. No. 3,242,129 or U.S. Pat. No. 4,465,809, by reaction of the anionic ends of the polymer chain with $CO_2$.

Especially silanes and cyclosiloxanes having a total of at least two halogen and/or alkoxy and/or aryloxy substituents on silicon are of good suitability for end group functionalization of diene rubbers, since one of said substituents on the silicon atom can be readily exchanged in a rapid substitution reaction for an anionic diene end of the polymer chain and the further aforementioned substituent(s) on Si is/are available as a functional group which, optionally after hydrolysis, can interact with the filler of the tyre tread mixture. Examples of silanes of this kind can be found in U.S. Pat. No. 3,244,664, U.S. Pat. No. 4,185,042, EP0778311A1 and US20050203251A1.

WO2012/065908A1 describes 1-oxa-2-silacycloalkanes as functionalizing reagents for introduction of hydroxyl end groups in diene polymers. These 1-oxa-2-silacycloalkanes do not have the disadvantages of the silanes described in the above paragraph, such as reaction of a plurality of anionic ends of the polymer chain per silane molecule, elimination of troublesome components and coupling to form Si—O—Si bonds in the course of workup and storage.

All the functionalized polymers known from the prior art can be used for the inventive rubber composition.

A functionalized polymer used with preference is an end group-functionalized butadiene-styrene copolymer (end group-functionalized SSBR) prepared by solution polymerization. Preferably, the functional groups are hydroxyl and/or carboxyl groups, siloxy groups. In one embodiment, the functional groups are hydroxyl and/or carboxyl and/or siloxy groups.

Preferably, the end group-functionalized butadiene-styrene copolymer for the inventive rubber composition has Mooney viscosities (ML 1+4 at 100° C.) of 10 to 200 and preferably 30 to 150 Mooney units and mean molar masses (number-average, $M_n$) of 10 000 to 2 000 000 g/mol, preferably of 100 000 to 1 000 000 g/mol.

For the inventive vulcanizable rubber composition, the end group-functionalized butadiene-styrene copolymer preferably has glass transition temperatures of −110° C. to +20° C., preferably −110° C. to 0° C.

Polybutadienes are used as important constituents of rubber mixtures in the tyre industry where improvement in the final properties is desired, for instance a reduction in rolling resistance and in abrasion. A further field of use is in golfball cores or shoe soles, where a high rebound resilience is the major concern. Polybutadienes having a high proportion of cis-1,4 units have long been produced on the industrial scale and used for the production of tyres and other rubber products, and for impact modification of polystyrene.

High proportions of cis-1,4 units are currently achieved almost exclusively using catalysts based on compounds of the rare earths, as described, for example, in EP-A 1 0 011 184 and EP-A1 0 007 027.

It is known from the prior art that specifically neodymium-catalysed polybutadienes, in the group of the high-cis polybutadienes, have particularly advantageous properties in terms of rolling resistance, abrasion and rebound resilience. In the preparation of polybutadienes, the catalyst systems used play an important role.

The neodymium catalyst used in industry is for example a Ziegler/Natta system which is formed from several catalyst components. In the formation of the catalyst, different catalyst sites are usually formed, which can be recognized in the polymer by an at least bimodal molar mass distribution. In the Ziegler/Natta catalyst system, the known 3 catalyst components, usually consisting of a neodymium source, a chloride source and an organoaluminium compound, are mixed in a wide variety of different ways under particular temperature conditions, the catalyst system being prepared with or without ageing for the polymerization.

The prior art discloses several production processes for Ziegler/Natta catalyst systems which are used for preparation of polybutadienes.

EP 0 127 236 describes, for example, a process in which the catalyst is prepared by the mixing of neodymium oxides, neodymium alkoxides and carboxylates with organometallic halides and an organic compound at a temperature of 20° C. to 25° C. It is also possible to conduct the mixing of these four components at 50° C. to 80° C. In this variant, the mixture is cooled to 20 to 25° C., then DIBAH is added.

EP 1 176 157 B1 discloses a process for preparing polybutadienes with a reduced ratio of solution viscosity/Mooney viscosity, in which the catalyst preparation is conducted with preforming. This involves first mixing neodymium versatate with DIBAH and isoprene at 50° C., then cooling this mixture down to 5° C., then adding ethylaluminium sesquichloride (EASC). The ageing may take several minutes up to several days at a temperature between 10° C. and −80° C. During the polymerization, comonomers, for example a bisdiene, are added in order to increase the level of branching of the polymer and hence also to obtain the very close relationship of solution viscosity/Mooney viscosity. The branched polymer obtained has at least 4 free chain ends per molecule through the coupling via the bisdiene, whereas linear molecules have only 2 chain ends.

The number of chain ends in the polymer is responsible for the dissipation of energy. The higher the number of free chain ends, the higher the dissipation of energy by the polymer.

However, the lower the dissipation of energy of the polymer, the lower the rolling resistance, for example, and the better the rebound resilience of the polymer. Accordingly, the final properties of a linear polymer having only 2 chain ends per molecule are always better than those of a branched polymer with the same molar mass.

Preference is given to using Ziegler-Natta catalysts based on compounds of the rare earth metals, such as cerium, lanthanum, praseodymium, gadolinium or neodymium compounds which are soluble in hydrocarbons. Particular preference is given to using the corresponding salts of the rare earth metals as Ziegler-Natta catalysts, such as neodymium phosphonates, neodymium carboxylates, especially neodymium neodecanoate, neodymium octanoate, neodymium naphthenate, neodymium 2,2-diethylhexanoate or neodymium 2,2-diethylheptanoate, and the corresponding salts of lanthanum or praseodymium. In addition, the usable Ziegler-Natta catalysts also include catalyst systems based on metallocenes, as described, for example, in EP-A 1025136 and EP-A 1078939.

It is known that commercial produced polymers have a random molar mass distribution, the breadth of the molar mass distribution being influenced by the catalyst preparation.

This firstly promotes the production of low molecular weight base polymers, which has the great advantage of enabling, in the solution polymerization techniques typically employed, lower viscosities in the "cement" (solution of the polymer in the organic dissolution medium which is used in the polymerization), and therefore allows operation with high solids contents in the cement, since better heat transfer is achieved. It is also possible to reduce the cold flow of such diene polymers, and so they can be extended with oil to a greater extent.

It is additionally known that polydienes with low cold flow can be produced when the diene polymers, after the polymerization, are treated with disulphur dichloride, sulphur dichloride, thionyl chloride, disulphur dibromide or thionyl bromide (DE-B 12 60 794).

DE 44 36 059 A1 likewise describes a method for abruptly increasing the molecular weight of Nd-catalysed diene rubbers, wherein the inherent odour of the polymer is reduced by a decompression step after the polymerization, in order to remove all the low-boiling constituents of the reaction mixture.

Component b):

It is possible to use all the polybutadienes known from the prior art as component b) for the inventive rubber composition, provided that the Mooney viscosity thereof (ML 1+4 at 100° C.) has been increased once again by modification after the polymerization. Modifications of this kind are known to those skilled in the art by the names "abrupt increase in Mooney viscosity" or "Mooney jump".

This modification is typically effected by reaction with sulphur chlorides.

The term "abrupt increase in Mooney viscosity" and its derivatives, for instance "Mooney jump" relate to techniques by which the Mooney viscosity (ML 1+4 at 100° C.) of the polymers is increased significantly after the polymerization or the level of branching is increased. Typically, the polymer is modified with $S_2Cl_2$, in order to branch the polymer via sulphur bridge formation according to the following schematic reaction equation:

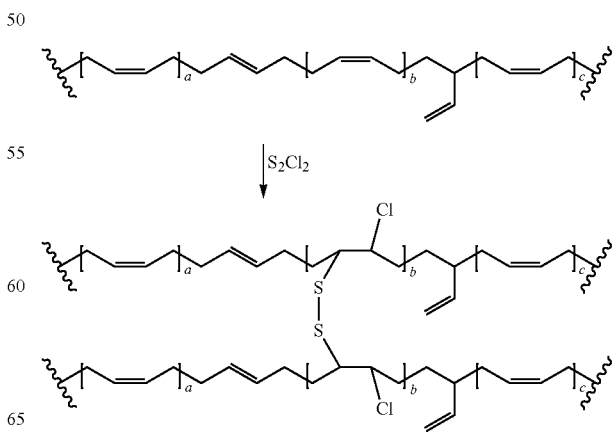

The level of branching or the Mooney viscosity (ML 1+4 at 100° C.) is thus increased. The reaction scheme shown above describes the "Mooney jump" by way of example for a high-cis polybutadiene, and this reaction can also be conducted on all other diene-containing polymers.

For clarification of the terms, the following are understood as follows:

Starting Mooney viscosity: Mooney viscosity (ML 1+4 100° C.) after the polymerization of the polymer.

Final Mooney viscosity: Mooney viscosity (ML 1+4 100° C.) after the modification or Mooney jump or jump reaction of the polymer (jump polymer).

Jump polymer: Polybutadiene after the modification, after the Mooney jump or after the jump reaction.

Preferably, the modified polybutadiene is polymerized by solution polymerization in the presence of at least one inert organic solvent and in the presence of at least one catalyst based on neodymium compounds within a temperature range from −20° C. to 150° C., the polymerization is stopped by adding protic compounds and the polymer is modified by means of sulphur chlorides.

Preferably, the sulphur chlorides, prior to addition, are treated with a carboxylic acid, fatty acid and/or fatty acid ester.

Preferably, the sulphur chlorides are disulphur dichloride, sulphur chloride, sulphur bromide, sulphur dichloride, thionyl chloride, disulphur dibromide and/or thionyl bromide.

Particular preference is given to using, as component b) in the vulcanizable rubber composition, a modified polybutadiene having a Mooney viscosity (ML 1+4 at 100° C.) which has been increased by at least 50% in the course of the preceding modification reaction through reaction of the polybutadiene with sulphur chlorides, based on the Mooney viscosity (ML 1+4 at 100° C.) of the polybutadiene prior to addition of the sulphur chlorides.

Preferably, the modified polybutadiene after the polymerization has a Mooney viscosity (ML 1+4 at 100° C.) (starting Mooney viscosity) of at least 20 MU, preferably 20-25 MU, more preferably at least 40 MU, and after the addition of sulphur chlorides has a Mooney viscosity (ML 1+4 at 100° C.) (final Mooney viscosity) of at least 30 MU, preferably 40-50 MU, more preferably 60-80 MU, where the gel content is less than 1% by weight.

Preference is given to using, for the inventive vulcanizable rubber composition, high molecular weight neodymium-catalysed polybutadienes (NdBR) having a proportion of cis-1,4 units of >95% by weight and a 1,2-vinyl content of <1% by weight, the NdBRs having been modified such that the Mooney viscosity (ML 1+4 at 100° C.) thereof has been increased after the polymerization.

Preferably, the NdBR is modified with sulphur chlorides after the polymerization.

A preferably embodiment of the inventive vulcanizable rubber composition includes:

a) 50 to 90 parts by weight, preferably 60 to 70 parts by weight, of at least one functionalized solution butadiene-styrene copolymer (SSBR) (oil-free) having a glass transition temperature (Tg) in the range from −110° C. to 20° C., based on the oil-free SSBR, b) 10-50 parts by weight, preferably 20 to 40 parts by weight, of at least one modified neodymium-catalysed polybutadiene (NdBR) having a Mooney viscosity (ML 1+4 at 100° C.) of at least 30 MU, c) 50-120 parts by weight, preferably 60-100 parts by weight, of at least one silica, d) 2-25 parts by weight, preferably 5-10 parts by weight, of at least one further filler, e) 1-5 parts by weight, preferably 2-4 parts by weight, of at least one vulcanizing agent, f) 5-50 parts by weight, preferably 10-40 parts by weight, of at least one oil, g) optionally 1-7 parts by weight, preferably 2-5 parts by weight, of at least one rubber additive, where the parts by weight figures for components c) to g) are each based on 100 parts by weight of total rubber, i.e. the sum total of components a) and b).

The glass transition temperatures of the rubbers used as component a) are determined by means of DSC (Differential Scanning Calorimetry) to DIN EN ISO 11357-1 and DIN EN 61006. The temperature calibration is effected by means of the onset temperatures of the solid/liquid transition (deviations from the starting baseline and the rising melt curve) of indium (156.6° C.) and of lead (328° C.). Prior to commencement of the 1st heating cycle, the sample is cooled with liquid nitrogen to −130° C. at a cooling rate of 320 K/min. The subsequent heating is effected while purging with nitrogen gas at a heating rate of 20 K/min up to a temperature of 150° C. Thereafter, the sample is cooled to −130° C. with liquid nitrogen and heated at 20 K/min. For the evaluation, the thermogram of the 2nd heating step is used. The evaluation is effected by graphic means, by drawing three straight lines (see FIG. 1). The glass transition temperature Tg is obtained as the midpoint temperature of the points of intersection Y and Z.

For the determination of the glass transition temperature of oil-extended rubbers, the oil has to be removed from the rubber. The oil can be removed by exhaustive extraction with methanol in a Soxhlet extractor, the determination of the glass transition temperature being preceded by the removal of the adhering acetone under reduced pressure to constant weight. Alternatively, the oil can also be removed by reprecipitation of a toluenic rubber solution with the aid of methanol. For this purpose, the oil-extended rubber is cut into small pieces and dissolved in toluene at room temperature while stirring (1 g of rubber dissolved in 50 g of toluene). Thereafter, the toluenic rubber solution is gradually added dropwise to 500 g of methanol while stirring at room temperature. The coagulated rubber is isolated, the adhering solvent is squeezed off by mechanical means and then the rubber is dried under reduced pressure to constant weight.

Component c):

According to the invention, at least one light-coloured reinforcing filler is used as component c). It is also possible to use a plurality of light-coloured reinforcing fillers as component c). "Light-coloured" in the context of the invention rules out carbon black in particular. The reinforcing light-coloured filler is preferably silica ($SiO_2$) or alumina ($Al_2O_3$) or mixtures thereof.

If silica (Ullmann's Encyclopedia of Industrial Chemistry, VCH Verlagsgesellschaft mbH, D-69451 Weinheim, 1993, "Silica", p. 635-647) is used, it is fumed silica (ibid. p. 635-647) or precipitated silica (ibid. 642-647). Precipitated silicas are obtained by treatment of waterglass with inorganic acids, preference being given to using sulphuric acid. The silicas may optionally also be in the form of mixed oxides with other metal oxides, such as oxides of Al, Mg, Ca, Ba, Zn, Zr, Ti, Preference is given to precipitated silicas having specific surface areas of 5 to 1000 $m^2/g$, preferably of 20 to 400 $m^2/g$, determined in each case to BET. For the production of tyre treads with low rolling resistance, highly dispersible precipitated silicas are preferred. Examples of preferred highly dispersible silicas include, for example: Perkasil® KS 430 (AKZO), BV 3380 and Ultrasil® 7000 (Evonik-Degussa), Zeosil® 1165, MP 1115 MP and HRS 1200 MP (Rhodia), Hi-Sil 2000 (PPG), Zeopol® 8715, 8741 or 8745 (Huber), Vulkasil® S, N and C from Lanxess and treated precipitated silicas, for example aluminium-"doped" silicas described in EP-A-0 735 088. One or more silica types may be used.

Alumina can likewise be used, for example in the form of highly dispersible alumina as described in EP-A-0 810 258. Examples include: AI25 or CR125 (Baikowski), APA-100RDX (Condea), Aluminium oxide C (Degussa) and AKP-GO 15 (Sumitomo Chemicals).

The light-coloured reinforcing filler may be in the form of powders, microbeads, granules or pellets. In a preferred embodiment, silicas and/or aluminas are used. Particular preference is given to silicas, especially precipitated silicas.

The total content of hydroxyl-containing oxidic filler is typically in the range of 50 up to 120 parts by weight, preferably in the range of 60 to 100 parts by weight and especially preferably 25 to 90 parts by weight, based on 100 parts by weight of oil-free total rubbers (sum total of a) and b)).

It has also been found to be useful to use the at least one light-coloured filler (component c) together with at least one polysulphide-containing alkoxysilane. These are called coupling agents, and disperse and bind the reinforcing filler into the elastomer matrix. As is known to those skilled in the art, these bear two kinds of functional groups, the alkoxysilyl group which binds to the light-coloured filler, and the sulphur-containing group which binds to the elastomer. According to the invention, one or more of the polysulphide-containing alkoxysilanes can be used in combination.

Particularly suitable polysulphide-containing alkoxysilanes are those of the formulae (I) and (II) which follow, though the definitions which follow should not be understood to be limiting. Those of the formula (I) are those which bear a correspondingly substituted silyl group on both sides of the central sulphur, while this is the case only on one side in the formula (II).

It is thus possible to use polysulphide-containing alkoxysilanes of the general formula (I) or (II)

$$Z\text{-}A\text{-}S_x\text{-}A\text{-}Z \quad (I)$$

$$Z\text{-}A\text{-}S_y\text{-}R^3 \quad (II)$$

in which
x is an integer from 2 to 8,
y is an integer from 1 to 8,
A are the same or different and are each a divalent hydrocarbyl group ("spacer")
Z are the same or different and each have one of the following formulae:

in which
$R^1$ are the same or different, may be substituted or unsubstituted, and are a $C_1$-$C_{18}$ alkyl group, a $C_5$-$C_{18}$ cycloalkyl group or $C_6$-$C_{18}$ aryl group and
$R^2$ are the same or different, may be substituted or unsubstituted, and are a $C_1$-$C_{18}$ alkoxy group, a $C_5$-$C_{18}$ cycloalkoxy group or $C_6$-$C_{18}$ aryloxy group,
and
$R^3$ is hydrogen, straight-chain or branched alkyl, where the alkyl chain may optionally be interrupted by one or more, preferably up to 5, heteroatoms, especially oxygen, sulphur or N(H), aryl, preferably $C_6$-$C_{20}$-aryl and/or a radical having the following structures:

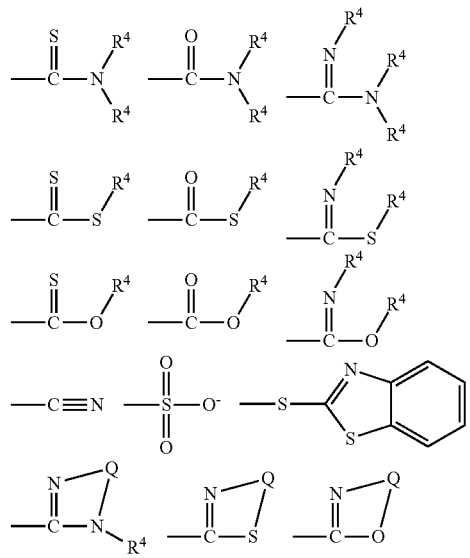

in which
$R^4$ is an aliphatic, heteroaliphatic, cycloaliphatic, aromatic or heteroaromatic radical having 1 to 20, preferably 1 to 10, carbon atoms and optionally having 1 to 3 heteroatoms, preferably oxygen, nitrogen or sulphur.

In the polysulphide-containing alkoxysilanes of the general formula (I), the number x is preferably an integer from 2 to 5. In the case of a mixture of polysulphide-containing alkoxysilanes of the above-specified formula (I), and especially in the case of customary, commercially available mixtures, "x" is a mean value which is preferably in the range of 2 to 5 and especially close to 2 or 4. The invention can advantageously be conducted with alkoxysilane sulphides where x=2 and x=4.

In the polysulphide-containing alkoxysilanes of the general formulae (I) and (II), the substituted or unsubstituted A groups are the same or different and are preferably each a divalent aliphatic, heteroaliphatic, aromatic or heteroaromatic hydrocarbyl group which is saturated or mono- or polyunsaturated and has 1 to 20, preferably 1 to 18, carbon atoms and optionally 1 to 3 heteroatoms, especially oxygen, sulphur or nitrogen. Suitable A groups are especially $C_1$-$C_{18}$ alkylene groups or $C_6$-$C_{12}$ arylene groups, particular preference being given to $C_1$-$C_{10}$ alkylene groups, especially $C_2$-$C_4$ alkylene groups, and very particular preference being given to propylene.

In the polysulphide-containing alkoxysilanes of the general formulae (I) and (II), $R^1$ are the same or different and are preferably each $C_1$-$C_6$ alkyl, cyclohexyl or phenyl, more preferably $C_1$-$C_4$ alkyl and especially methyl and/or ethyl.

In the polysulphide-containing alkoxysilanes of the general formulae (I) and (II), $R^2$ are the same or different and are preferably each $C_1$-$C_{10}$-alkoxy, more preferably $C_1$-$C_8$-alkoxy, especially methoxy and/or ethoxy, $C_5$-$C_8$ cycloalkoxy, more preferably cyclohexyloxy, or $C_6$-$C_{14}$ aryloxy, more preferably phenoxy.

These "symmetric" polysulphide-containing alkoxysilanes and various processes for preparation thereof are described, for example, in U.S. Pat. No. 5,684,171 and U.S.

Pat. No. 5,684,172, which specify a detailed list of known compounds for x in the range from 2 to 8.

The polysulphide-containing alkoxysilane is preferably a polysulphide, especially a disulphide or a tetrasulphide, of bis($C_1$-$C_4$)trialkoxysilylpropyl, more preferably bis($C_1$-$C_4$) trialkoxysilylpropyl and especially bis(2-ethoxysilylpropyl) or bis(3-trimethoxysilylpropyl) or bis(triethoxysilylpropyl). The disulphide of bis(triethoxysilylpropyl) or TESPD of the formula $[(C_2H_5O)_3Si(CH_2)_3S]_2$ is commercially available, for example, from Evonik Degussa under the Si266 or Si75 names (in the second case in the form of a mixture of disulphide and polysulphide), or else from Witco under the Silquest A 1589 name. The tetrasulphide of bis(triethoxysilylpropyl) or TESPT of the formula $[(C_2H_5O)_3Si(CH_2)_3S_2]_2$ is available, for example, from Evonik Degussa under the SI 69 name (or X-50S with 50% by weight of carbon black as a carrier) or from Witco under the Silquest A 1289 name (in both cases, a commercial mixture of polysulphide having a mean value for x close to 4).

The polysulphide-containing alkoxysilanes are used in the inventive rubber mixtures appropriately at 6 to 12% by weight, preferably 1 to 10% by weight, based on 100% by weight of silica.

Component d):

The inventive vulcanizable composition comprises at least one further filler as component d). Fillers used may, for example, be carbon black, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form), or silicates. Preference is given to using carbon black.

Useful carbon blacks have been found to be carbon blacks of the HAF, ISAF and SAF type, which are used customarily in pneumatic tyres and especially in the treads of pneumatic tyres. Examples of these carbon blacks include N110, N 115, N220, N134, N234, N339, N347 and N375, which are sufficiently well known to those skilled in the art and are commercially available from various manufacturers.

If carbon black is used as a further filler, the proportion of the silica (component c) is, however, more than 50% by weight, preferably more than 75% by weight, based on the total amount of the fillers used in the form of components c) and d). The proportion of carbon black is then less than 50% by weight and more preferably less than 40% by weight. In a preferred embodiment, in the inventive rubber compositions, carbon black is added in amounts of 2 to 25 parts by weight, preferably 5-10 parts by weight, based on 100 parts by weight of oil-free total rubber.

Component e):

According to the invention, at least one vulcanizing agent is used as component e). It is also possible to use a plurality of vulcanizing agents. Some examples are given below.

Sulphur is suitable for crosslinking of the inventive rubber composition, either in the form of elemental sulphur or in the form of a sulphur donor. Elemental sulphur is used in the form of soluble or insoluble sulphur.

Soluble sulphur is understood to mean the only form which is stable at normal temperatures, yellow cyclooctasulphur ($S_8$) or α-S, which consists of typical rhombic crystals and has high solubility in carbon disulphide. For instance, at 25° C., 30 g of α-S dissolve in 100 g of $CS_2$ (see "Schwefel" [Sulphur] in the online Römpp Chemie Lexikon, August 2004 version, Georg Thieme Verlag Stuttgart).

Insoluble sulphur is understood to mean a sulphur polymorph which does not have a tendency to exude at the surface of rubber mixtures. This specific sulphur polymorph is insoluble to an extent of 60 to 95% in carbon disulphide.

Examples of sulphur donors are caprolactam disulphide (CLD), dithiomorpholine (DTDM) or 2-(4-morpholinodithio)benzothiazole (MBSS) (W. Hoffmann "Kautschuktechnologie" [Rubber Technology], p. 254 ff, Gentner Verlag Stuttgart (1980)).

Sulphur and/or sulphur donors are used in the inventive rubber mixture in an amount in the range of 0.1 to 15 parts by weight, preferably 0.1-10 parts by weight, based on 100 parts by weight of oil-free total rubber.

In the inventive rubber mixture, it is additionally also possible to use one or more vulcanization accelerators suitable for sulphur vulcanization.

Corresponding vulcanization accelerators are mentioned in J. Schnetger "Lexikon der Kautschuktechnik" [Lexicon of Rubber Technology], 3rd edition, Hüthig Verlag Heidelberg, 2004, pages 514-515, 537-539 and 586-589.

In the context of the present invention, such vulcanization accelerators may, for example, be selected from the group of the xanthogenates, dithiocarbamates, tetramethylthiuram disulphides, thiurams, thiazoles, thiourea derivatives, amine derivatives such as tetramines, sulphenimides, piperazines, amine carbamates, sulphenamides, bisphenol derivatives and triazine derivatives, and also polythiophosphorus compounds of the general formula (III) or (IV)

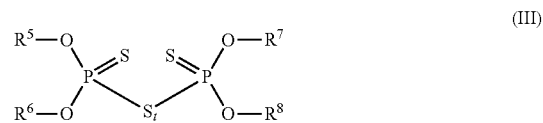

(III)

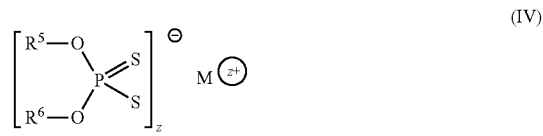

(IV)

in which $R^5$, $R^6$, $R^7$ and $R^8$ are the same or different and are each aliphatic, heteroaliphatic, aromatic or heteroaromatic radicals having 1 to 24, preferably 1 to 18, carbon atoms, and optionally 1 to 4 heteroatoms, especially N, S or O, t is an integer from 1 to 8, preferably 3 to 6, z is an integer from 1 to 3, preferably 1 to 2, and $M^{z+}$ is a metal cation with the charge z+, where z+ is 1 to 3, preferably 1 and 2, or a cation of the formula $N(R^9)_4^+$ in which $R^9$ are the same or different and can be each hydrogen and/or as defined for $R^5$.

The compounds of the general formula (III) are phosphoryl polysulphides, and the compounds of the general formula (IV) dithiophosphates.

The following metal cations are options for $M^{z+}$: Li, Na, K, Rb, Cs, Be, Mg, Ca, Sr, Ba, Al, Nd, Zn, Cd, Ni and Cu. Preference is given to: Na, K, Zn and Cu. Likewise preferably, $M^{z+}$ is $NH_4^+$.

The following metal dithiophosphates are of particular interest:

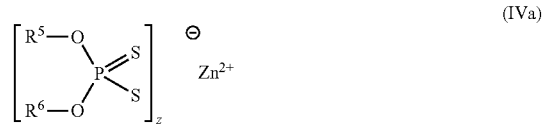

(IVa)

in which z is 2, $R^5$ and $R^6$ are the same or different and are each hydrogen or a straight-chain or branched, substituted or unsubstituted alkyl group or cycloalkyl group having 1 to 12 carbon atoms, more preferably a $C_2$-$C_{12}$ alkyl group or a $C_5$-$C_{12}$ cycloalkyl group and especially ethyl, propyl, isopropyl, butyl, isobutyl, cyclohexyl, ethylhexyl or dodecyl.

Such compounds of the general formula (III) or (IV) may optionally also be used in supported or polymer-bound form.

Suitable vulcanization accelerators are benzothiazyl-2-cyclohexylsulphenamide (CBS), benzothiazyl-2-tert-butyl-sulphenamide (TBBS), benzothiazyl-2-dicyclohexylsulphenamide (DCBS), 1,3-diethylthiourea (DETU), 2-mercaptobenzothiazole (MBT) and zinc salts thereof (ZMBT), copper dimethyldithiocarbamate (CDMC), benzothiazyl-2-sulphene morpholide (MBS), benzothiazyldicyclohexylsulphenamide (DCBS), 2-mercaptobenzothiazole disulphide (MBTS), dimethyldiphenylthiuram disulphide (MPTD), tetrabenzylthiuram disulphide (TBZTD), tetramethylthiuram monosulphide (TMTM), dipentamethylenethiuram tetrasulphide (DPTT), tetraisobutylthiuram disulphide (IBTD), tetraethylthiuram disulphide (TETD), tetramethylthiuram disulphide (TMTD), zinc N-dimethyldithiocarbamate (ZDMC), zinc N-diethyldithiocarbamate (ZDEC), zinc N-dibutyldithiocarbamate (ZDBC), zinc N-ethylphenyldithiocarbamate (ZEBC), zinc dibenzyldithiocarbamate (ZBEC), zinc diisobutyldithiocarbamate (ZDiBC), zinc N-pentamethylenedithiocarbamate (ZPMC), zinc N-ethylphenyldithiocarbamate (ZEPC), zinc 2-mercaptobenzothiazole (ZMBT), ethylenethiourea (ETU), tellurium diethyldithiocarbamate (TDEC), diethylthiourea (DETU), N,N-ethylenethiourea (ETU), diphenylthiourea (DPTU), triethyltrimethyltriamine (TTT); N-t-butyl-2-benzothiazole-sulphenimide (TBSI); 1,1'-dithiobis(4-methylpiperazine); hexamethylenediamine carbamate (HMDAC); benzothiazyl-2-tert-butylsulphenamide (TOBS), N,N'-diethylthiocarbamyl-N'-cyclohexylsulphenamide (DETCS), N-oxydiethylenedithiocarbamyl-N'-oxydiethylenesulphenamide (OTOS), 4,4'-dihydroxydiphenyl sulphone (Bisphenol S), zinc isopropylxanthogenate (ZIX), selenium salts, tellurium salts, lead salts, copper salts and alkaline earth metal salts of dithiocarbamic acids; pentamethyleneammonium N-pentamethylenedithiocarbamate; cyclohexylethylamine; dibutylamine; polyethylenepolyamines, polyethylenepolyimines, for example triethylenetetramine (TETA), phosphoryl polysulphides, for example:

where t=2 to 4, (Rhenocure® SDT/S bound to 30% by weight of high-activity silica from Rhein Chemie Rheinau GmbH) and zinc dithiophosphate, for example Rhenocure® ZDT/G bound to 30% by weight of high-activity silica and 20% by weight of polymer binder from Rhein Chemie Rheinau GmbH having the formula

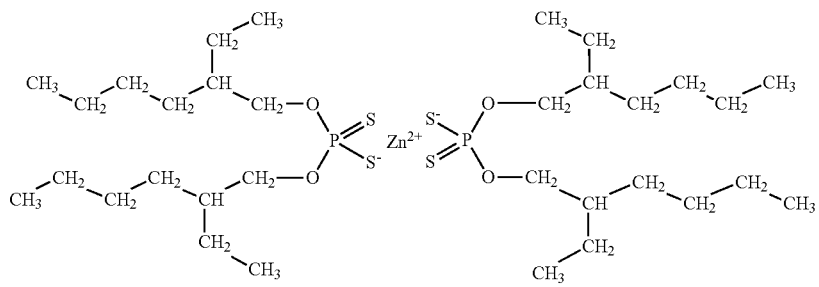

The vulcanization accelerators are preferably used in an amount in the range of 0.1 to 15 parts by weight, preferably 0.1-10 parts by weight, based on 100 parts by weight of oil-free total rubber.

The inventive mixture may further comprise zinc oxide as an activator for the sulphur vulcanization. The selection of a suitable amount is possible for the person skilled in the art without any great difficulty. If the zinc oxide is used in a somewhat higher dosage, this leads to increased formation of monosulphidic bonds and hence to an improvement in ageing resistance.

Component f):

Customary process oils known to those skilled in the art are used as component f). Preference is given to using a naphthenic oil having a glass transition temperature (Tg) between −80° C. and −40° C. a level of DMSO extractables by the IP 346 method of less than 3% by weight, of which the sum total of polycyclic aromatics is <10 ppm and the amount of alpha-benzopyrene is <1 ppm, measured by the Grimmer test. The Grimmer test by the method of Prof. Grimmer, Hamburg-Ahrensburg, is published in Fresenius, Analytische Chemie [Analytical Chemistry], 1983, volume 314, p. 29-36.

Components g):

The inventive rubber composition may include one or more further rubber additives.

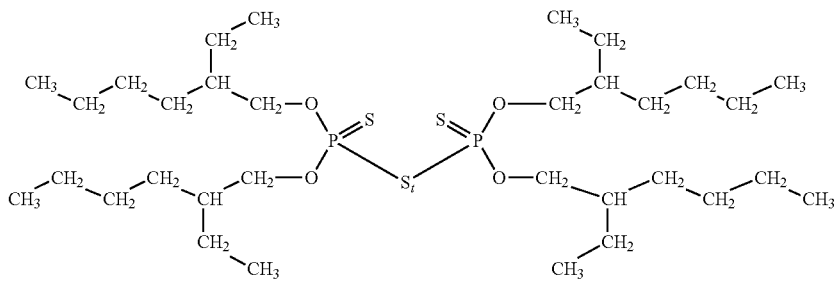

For example, stearic acid (octadecanoic acid) may be present. This is known by the person skilled in the art to have a broad spectrum of action in rubber technology. For instance, one of its effects is that it leads to improved dispersion of zinc oxide and of the vulcanization accelerator. In addition, complex formation occurs with zinc ions in the course of sulphur vulcanization.

It is also possible for zinc oxide to be present in the inventive composition. Useful amounts have been found to be from 0.5 to 15 parts by weight, preferably 1 to 7.5 parts by weight, more preferably 1% to 5% by weight, based on 100 parts by weight of oil-free total rubber.

Stearic acid is preferably used in the inventive composition in an amount of 0.1 to 7, preferably 0.25 to 7, parts by weight, preferably 0.5 to 5 parts by weight, based on 100 parts by weight of oil-free total rubber.

Alternatively or else additionally to the combination of zinc oxide and stearic acid, zinc stearate may be used. In this case, typically an amount of 0.25 to 5 parts by weight, preferably 1 to 3 parts by weight, based in each case on 100 parts by weight of oil-free total rubber, is used.

Further rubber additives to be added optionally as component(s) g) of the inventive rubber mixtures include ageing stabilizers, reversion stabilizers, light stabilizers, ozone stabilizers, waxes, mineral oil, processing aids, plasticizers, mineral oils, tackifiers, blowing agents, dyes, pigments, resins, extenders, organic acids, vulcanization retarders, metal oxides and further filler-activators, for example triethanolamine, trimethylolpropane, polyethylene glycol, hexanetriol or other additives, for instance carbon black, known in the rubber industry (Ullmann's Encyclopedia of Industrial Chemistry, VCH Verlagsgesellschaft mbH, D-69451 Weinheim, 1993, vol A 23 "Chemicals and Additives", p. 366-417).

Vulcanization retarders added to the inventive compositions may, for example, be sulphonamides, sulphanilides or phthalimides. Suitable examples are N-trichloromethylsulphenylbenzenesulphanilide, N-cyclohexylthiophthalimide, phthalic anhydride (PTA), salicylic acid (SAL), N-nitrosodiphenylamine (NDPA), trichloromelamine (TCM), maleic anhydride (MSA) and N-trichloromethylsulphenylbenzenesulphanilide (the latter being commercially available under the Vulkalent® E name). Corresponding vulcanization retarders are likewise mentioned in J. Schnetger, "Lexikon der Kautschuktechnik", 3rd edition, Hüthig Verlag, Heidelberg, 2004, page 590.

Antioxidants added to the inventive compositions may, for example, be mercaptobenzimidazole (MBI), 2-mercaptomethylbenzimidazole (2-MMBI), 3-mercaptomethylbenzimidazole (3-MMBI), 4-mercaptomethylbenzimidazole (4-MMBI), 2,2,4-trimethyl-1,2-dihydroquinoline (TMQ), nickel dibutyldithiocarbamate (NDBC), 2,6-di-tert-butyl-p-cresol (BHT) and 2,2'-methylenebis(4-methyl-6-tert-butylphenol) (BKF). These antioxidants may also be used in non-dusting, especially also polymer-bound, supply forms (as "microgranules" (MG) or "microgranules coated" (MGC)).

In addition, it is also possible to use ageing stabilizers, for example in the form of discolouring ageing stabilizers with antifatigue and antiozone action, for example N-isopropyl-N'-phenyl-p-phenylenediamine (IPPD); N-1,3-dimethylbutyl-N'-phenyl-p-phenylenediamine (6PPD), N-1,4-dimethylpentyl-N'-phenyl-p-phenylenediamine (7PPD), N,N'-bis-(1,4-dimethylpentyl)-p-phenylenediamine (77PD) etc., discolouring ageing stabilizers with fatigue protection but no antiozone action, for example phenyl-α-naphthylamine (PAN); discolouring ageing stabilizers with low antifatigue action and no antiozone action, for example octylated diphenylamine (ODPA); non-discolouring ageing stabilizers with fatigue protection and good heat protection, for example styrenized phenols (SPH); non-discolouring ozone stabilizers with no anti-ageing action, for example waxes (mixtures of specific hydrocarbons), cyclic acetals and enol ethers; and hydrolysis stabilizers, for example polycarbodiimides.

In addition, mastication chemicals can also be added to the inventive rubber compositions, these preferably being selected from the group consisting of thiophenols, thiophenol zinc salts, substituted aromatic disulphides, derivatives of thiocarboxylic acids, hydrazine derivatives, nitroso compounds and metal complexes, especially preferably iron hemiporphyrazine, iron phthalocyanine, iron acetonylacetate and the zinc salt thereof. The mastication chemicals are especially used for mastication of the natural rubber used in the mixture, the mastication of the natural rubber preferably being conducted in a separate process step prior to the actual mixture production.

The rubber additives usable as component(s) g) are used in customary amounts guided by factors including the end use. Customary amounts for individual rubber additives are, for example, 0.1 to 50 phr, this stated amount neglecting oil which is introduced into the rubber compositions as an extender of rubbers.

The invention further provides for the production of the inventive rubber composition. This is preferably effected by mixing components a) to f) and optionally g). The mixing can be effected in one stage or up to 6 stages. A three-stage mixing operation with two mixing stages in an internal mixer and a final mixing stage on a roller (called "ready-mixing stage") has been found to be useful. Another possibility is a two-stage mixing operation with the 1st mixing stage in an internal mixer and the 2nd mixing stage on a roller. A further possibility is a 2-stage mixing operation in which both mixing stages are effected in an internal mixer, the mixture being cooled prior to addition of the components which are typically added on the roller to temperatures of <120° C. preferably <110° C.

Suitable equipment for the production of the inventive rubber compositions is known per se and includes, for example, rollers, internal mixers or else mixing extruders.

In the case of use of a 2-stage mixing operation in an internal mixer or a three- or multistage mixing process, in the first and/or in the second and later mixing stages, preferably in the first and second mixing stages, temperatures of 60° C. to 180° C., preferably 120° C. to 175° C., especially preferably 125° C. to 170° C. are employed, the mixing times at these temperatures being in the range of 1 to 15 minutes and being selected such that vulcanization does not begin at this early stage (incipient vulcanization or scorch). The starting temperature is preferably 60° C.

The temperatures in the ready-mixing stage are 20 to 120° C., preferably 30 to 110° C.

Typically, the mixing in an internal mixer is effected within a temperature range of 20 to 180° C., preferably within the temperature range of 50 to 170° C., or on a roller at less than 110° C. The selection of a suitable temperature can be undertaken by the person skilled in the art on the basis of his or her specialist knowledge, ensuring that, on the one hand, the silica is silanized in the course of mixing and, on the other hand, there is no premature vulcanization (scorching).

The vulcanization of the inventive compositions is effected typically at a temperature in the range of 100 to 250° C., preferably of 130 to 180° C., either under standard pressure (1 bar) or optionally under a pressure of up to 200 bar. The crosslinking takes place in the course of a shaping operation.

The rubber compositions produced in accordance with the invention are suitable for production of vulcanizates and for production of pneumatic tyres, winter tyres, tyre components, especially tyre treads, subtreads, carcasses, sidewalls, reinforced sidewalls for runflat tyres and apex mixtures, and for the production of industrial rubber articles, preferably damping elements, roll coverings, conveyor belt coverings, drive belts, spinning cops, seals, golf ball cores and shoe soles.

The inventive rubber compositions are illustrated in detail hereinafter by examples.

EXAMPLES

I. Rubbers

Various polybutadienes and SSBRs were used for the inventive rubber compositions. All the polybutadienes and SSBRs are products from Lanxess Deutschland GmbH.

Table 1 shows the polybutadienes used; Buna PBR 4065 (trade name: Buna® Nd 24 EZ) and Buna PBR 4076 (trade name: Buna® 22 EZ) are modified polybutadienes. In addition, Table 1 summarizes the important properties.

TABLE 1

Polybutadienes used

| High-cis poly-butadiene | Type | Modification | MV [1] [MU] | MSR [2] [MU/s] | SV [3] [mPas] | Branching index (MV/SV)*10 | Mn [kg/mol] | Mw [kg/mol] | PDI [4] |
|---|---|---|---|---|---|---|---|---|---|
| Buna CB 1203 | CoBR | no | 43 | 0.41 | 145 | 3.0 | 145 | 395 | 2.7 |
| Buna CB 24 | NdBR | no | 43 | 0.68 | 230 | 1.9 | 205 | 420 | 2.0 |
| Buna CB 22 | NdBR | no | 63 | 0.74 | 350 | 1.8 | 235 | 466 | 2.0 |
| Buna PBR 4065 | NdBR | yes | 44 | 0.45 | 150 | 2.9 | 171 | 375 | 2.2 |
| Buna PBR 4076 | NdBR | yes | 63 | 0.45 | 280 | 2.3 | 212 | 462 | 2.2 |

[1] MV means the Mooney viscosity ML1 + 4 @ 100° C. in Mooney units [MU]
[2] The MSR value in Table 1 was determined to ISO 289-4:2003.
[3] The SV value (Solution Viscosity) in Table 1 was determined in a 5.43% by weight solution of the polymer in toluene with a Brookfield LVDC-1 + 1 rotary viscometer at a temperature of 23° C.
[4] The value for the polydispersity "PDI" is calculated as the weight-average molecular weight divided by the number-average molecular weight (PDI = Mw/Mn)

Table 2 shows the SSBRs used; PBR 4078 and PBR 4070 are end group-functionalized SSBRs. PBR 4088 is an SSBR functionalized in the polymer chain. VSL 5025-2 is unfunctionalized. In addition, Table 2 summarizes the important properties.

TABLE 2

SSBR used

| SSBR name | Polymer backbone functionalization | End group functionalization | Vinyl content [% by wt.] | Styrene content [% by wt.] | MV [1] [MU] | Oil content [% by wt.] | Tg [° C.] |
|---|---|---|---|---|---|---|---|
| VSL 5025-2 | no | no | 51 | 25 | 48 | 27 | −29 |
| VSL 5025-0 HM | no | no | 50 | 25 | 65 | 0 | −22 |
| PBR 4088 | yes | no | 40 | 26 | 54 | 27 | −31 |
| PBR 4078 | no | yes | 49 | 23 | 65 | 20 | −27 |
| PBR 4070 | no | yes | 32 | 34 | 81 | 27 | −29 |

[1] MV means the Mooney viscosity ML1 + 4 @ 100° C. in Mooney units [MU].

II. Formulations

For the mixture studies, the substances specified in Table 3 were used:

TABLE 3

| Trade name | Manufacturer |
|---|---|
| VULCAN J/N375 as carbon black | Cabot Corporation |
| TDAE oil | Hansen und Rosenthal KG |
| ZINKWEISS ROTSIEGEL as zinc oxide | Grillo Zinkoxid GmbH |
| EDENOR C 18 98-100 as stearic acid | Caldic Deutschland GmbH |
| VULKANOX 4020/LG as stabilizer | Lanxess Deutschland GmbH |
| VULKANOX HS/LG as stabilizer | Lanxess Deutschland GmbH |
| VULKACIT ® NZ/EGC as accelerator | Lanxess Deutschland GmbH |
| MAHLSCHWEFEL 90/95 CHANCEL, sulphur | Solvay Barium Strontium |
| ANTILUX 654, wax | RheinChemie Rheinau GmbH |
| Si 69, silane | Evonic Degussa GmbH |
| RHENOGRAN DPG-(80), diphenylguanidine | RheinChemie Rheinau GmbH |
| VULKALENT E/C, sulphonamide | Lanxess Deutschland GmbH |
| ULTRASIL 7000 GR, silica | Evonic Degussa GmbH |

Table 4 lists the formulations of the inventive rubber compositions. The figures given for the constituents in the rubber compositions are in phr (parts by weight per 100 parts by weight of total rubber).

The SSBRs from Table 2 are used as "S-SBR", and the polybutadienes from Table 1 for "High-cis NdBR".

TABLE 4

| Name | Amount in phr (g per 100 g of rubber) |
|---|---|
| SSBR (calculated without oil) | 70 |
| High-cis NdBR | 30 |
| Silica (ULTRASIL 7000 GR) | 90 |
| Si 69, silane | 7.2 |
| VULCAN J/N375 as carbon black | 7 |
| TDAE oil | 36.3 |
| AFLUX 37, GE 1837 as processing aid | 3 |
| ZINKWEISS ROTSIEGEL as zinc oxide | 3 |
| EDENOR C 18 98-100 as stearic acid | 1 |
| VULKACIT ® NZ/EGC as accelerator | 1.6 |
| VULKANOX 4020/LG as stabilizer | 2 |
| VULKANOX HS/LG as stabilizer | 2 |
| ANTILUX 654, wax | 2 |
| MAHLSCHWEFEL 90/95 CHANCEL, sulphur | 1.6 |
| RHENOGRAN DPG-(80), diphenylguanidine | 2.75 |
| VULKALENT E/C, sulphonamide | 0.2 |

III. Production of the Vulcanizates

For production of the vulcanizates, the constituents were mixed in and treated as follows:

1st mixing stage: 1.5 liter interlocking kneader, rotor speed 60 rpm, starting temperature 60° C.

0 sec—addition of all polymers 30 sec—addition of 2/3 silica, 2/3 silane, carbon black, oil, stearic acid, waxes and stabilizers 90 sec—addition of remaining silica and silane 150 sec—addition of zinc oxide 210 sec—purging 240 sec—attainment of the temperature of 150° C. and hold for 3 minutes 420 sec—ejection Roll out on the cold roller to give a sheet, leave to cool and store for at least 8 hours before the 2nd stage 2nd mixing stage: 1.5 liter interlocking kneader, rotor speed 60 rpm, starting temperature 60° C.

0 sec—addition of the entire mixture from the first mixing stage 120 sec—attainment of the temperature of 150° C. and hold at 150° C. for 3 minutes 300 c—ejection 3rd mixing stage: roller Mix in all the remaining crosslinking chemicals on a roller, with the temperature kept below 110° C.

IV. Vulcanizate Properties

The vulcanizate properties of the mixtures produced according to Section III are shown in Table 5.

TABLE 5

Vulcanizate properties of the mixtures

| | 1 | 2 | 3 | 4 | 5 | 6 |
|---|---|---|---|---|---|---|
| SSBR type | VSL 5025-2 | VSL 5025-2 | PBR 4088 | PBR 4088 | PBR 4070 | PBR 4070 |
| NdBR type | CB 24 | PBR 4065 | CB 24 | PBR 4065 | CB 24 | PBR 4065 |
| Shore A hardness 23° C. | 63 | 62 | 60 | 60 | 65 | 65 |
| Shore A hardness 60° C. | 60 | 59 | 57 | 55 | | |
| Rebound 23° C. (%) | 28 | 28 | 38 | 36 | 28 | 28 |
| Rebound 60° C. (%) | 52 | 53 | 61 | 60 | 54 | 54 |
| G*(15%) @ 60° C. (MPa) | 1.07 | 1.09 | 0.94 | 0.94 | 1.27 | 1.24 |
| tan δ (max) 60° C. | 0.166 | 0.17 | 0.131 | 0.136 | 0.171 | 0.172 |
| Eplexor tan δ 60° C. | 0.105 | 0.111 | 0.079 | 0.087 | 0.096 | 0.095 |
| Modulus 300% (MPa) ($\sigma_{300}$) | 12.8 | 11.8 | 14.6 | 13.5 | 13.7 | 13.8 |
| Mooney viscosity ML1 + 4 @ 100° C. | 66 | 58 | 68 | 64 | 87 | 81 |

| | 7 | 8 | 9 | 10 |
|---|---|---|---|---|
| SSBR type | PBR 4078 | PBR 4078 | VSL 5025-0HM | VSL 5025-0HM |
| NdBR type | CB 24 | PBR 4065 | CB 22 | PBR 4076 |
| Shore A hardness 23° C. | 61 | 63 | 60 | 60 |
| Shore A hardness 60° C. | 57 | 57 | 57 | 57 |
| Rebound 23° C. (%) | 33 | 32 | 33 | 31 |
| Rebound 60° C. (%) | 58 | 56 | 51 | 53 |
| G*(15%) @ 60° C. (MPa) | 1.17 | 1.05 | 1.11 | 1.06 |
| tan δ (max) 60° C. | 0.157 | 0.15 | 0.172 | 0.172 |
| Eplexor tan δ 60° C. | 0.092 | 0.096 | 0.116 | 0.104 |
| Modulus 300% (MPa) ($\sigma_{300}$) | 11.8 | 10.6 | 11.4 | 11.8 |
| Mooney viscosity ML1 + 4 @ 100° C. | 75 | 69 | 73 | 66 |

The test methods which were employed for the determination of the properties cited in Table 5 are specified further down.

It is found that the dynamic properties of the vulcanizates using PBR 4065 and PBR 4076 and vulcanizates using CB 24 and CB 22 have stayed about the same. Only the Mooney viscosity are lower in the case of the rubber compositions comprising modified polybutadienes.

Figure 2:
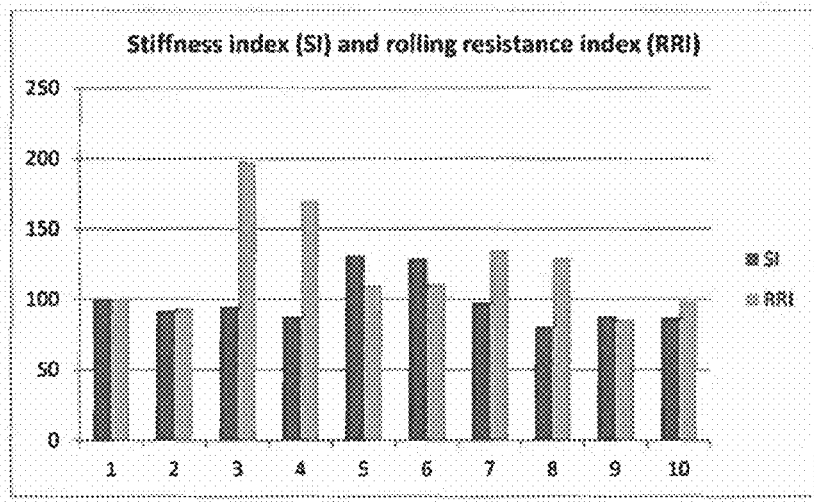
FIG. 2 comprises a graph of the values of the stiffness index (SI) and the rolling resistance index (RRI) which were determined for Examples 1 to 10.

Table 6 reports the stiffness index (SI) and rolling resistance index (RRI) for Examples 1-10, and they are also plotted as a graph in FIG. 2.

TABLE 6

Stiffness index (SI) and rolling resistance index (RRI)

| | Mixtures/vulcanizate based on component a)/component b) | SI[1] | RRI[2] |
|---|---|---|---|
| 1 | VSL 5025-2/CB24 | 100 | 100 |
| 2 | VSL 5025-2/PBR 4065 | 92 | 94 |
| 3 | PBR 4088/CB 24 | 95 | 198 |
| 4 | PBR 4088/PBR 4065 | 88 | 170 |
| 5 | PBR 4070/CB24 | 131 | 110 |
| 6 | PBR 4070/PBR 4065 | 129 | 111 |
| 7 | PBR 4078/CB 24 | 98 | 135 |
| 8 | PBR 4078/PBR 4065 | 81 | 130 |
| 9 | VSL 5025-0HM/CB 22 | 88 | 86 |
| 10 | VSL 5025-0HM/PBR 4076 | 87 | 99 |

[1]The stiffness index SI is calculated as follows: SI = Shore A hardness 23° C. × tensile strength S300 × G*(15%)@60° C. (MPa)
[2]The rolling resistance index (RRI) is calculated as follows: RRI = rebound resilience @60° C./tan δ (max) @ 60° C./tan δ @ 60° C. Eplexor For the aforementioned measurements, mixture 1 consisting of VSL 5025-2 and CB 24 is normalized to 100, since neither the SSBR nor the polybutadiene has been functionalized or modified.

It can be seen from Table 6 and FIG. 2 that the vulcanizates comprising modified polybutadienes 2, 4, 6, 8, 10 always have lower stiffness indices and lower rolling resistance indices than the vulcanizates lacking modified polybutadiene 1, 3, 5, 7, 9.

Thus, the inventive vulcanizates have not only improved processing characteristics (stiffness index) but also improved rolling resistance.

V. Methods/Din Standards Employed in the Vulcanizate Tests

The properties listed in Table 5 were determined on the vulcanizates to the following standards:
ASTM D1646-00 (for rubber composition): Mooney viscosity and Mooney stress relaxation
DIN 53505: Shore A hardness at 60° C.
DIN 53512: Rebound resilience at 60° C.
DIN 53504: Stress values at 10%, 100% and 300% elongation ($\sigma_{10}$, $\sigma_{100}$, and $\sigma_{300}$), tensile strength and elongation at break
DIN 53516: Abrasion
Determination of Dynamic Properties (Temperature Dependence of Storage Modulus E' in the Temperature Range of –60° C. to 0° C. and Tan δ at 60° C.):
For the determination of the dynamic properties (temperature dependence of the storage modulus E' in the temperature range of –60° C. to 0° C. and tan δ at 60° C.), an Eplexor instrument (Eplexor 500 N) from Gabo-Testanlagen GmbH, Ahlden, Germany was used. The measurements were determined to DIN53513 at 10 Hz on Ares strips within the temperature range of –100° C. to +100° C. at a heating rate of 1 K/min.
The method was used to obtain the following parameters which are named according to ASTM 5992-96:
E' (60° C.): storage modulus at 60° C.
E' (23° C.): storage modulus at 23° C.
E' (0° C.): storage modulus at 0° C.
and
tan δ (60° C.): loss factor (E"/E') at 60° C.
tan δ (23° C.): loss factor (E"/E') at 23° C.
tan δ (0° C.): loss factor (E"/E') at 0° C.
E' gives an indication of the grip of the tyre tread. The lower the E', the better the grip.

Tan δ (60° C.) is a measure of the hysteresis loss in the rolling of the tyre. The lower the tan δ (60° C.), the lower the rolling resistance of the tyre.

DIN 53513-1990: Elastic properties—for the determination of the elastic properties, an MTS elastomer test system (MTS Flex Test) from MTS was used. The measurements were made to DIN53513-1990 on cylinder samples (2 samples each of 20×6 mm) with total compression of 2 mm at a temperature of 60° C. and a measurement frequency of 1 Hz in the amplitude sweep range from 0.1% to 40%.

The method was used to obtain the following parameters which are named according to ASTM 5992-96:
G*(0.5%): dynamic modulus at 0.5% amplitude sweep
G*(15%): dynamic modulus at 15% amplitude sweep
G*(0.5%)-(15%): difference in the dynamic modulus at 0.5% from 15% amplitude sweep
and
tan δ (max): maximum loss factor (G"/G') in the entire measurement range at 60° C.

G*(0.5%)-(15%) gives an indication of the Payne effect of the mixture, a low value indicating a good filler distribution and hence a low rolling resistance.

Tan δ (max) is a measure of the hysteresis loss in the rolling of the tyre. The lower the tan δ (max), the lower the rolling resistance of the tyre.

VI. Surface Properties of the Extrudates

In addition, various extrudates were produced by means of an extruder (Brabender Plasticorder) at 90° C., 100° C. and 120° C. at a screw speed of 50 rpm (revolutions per minute) to ASTM D 2230. The smoother the edges and corners of the extrudate, the simpler the processibility of the rubber composition.

Figure 3:
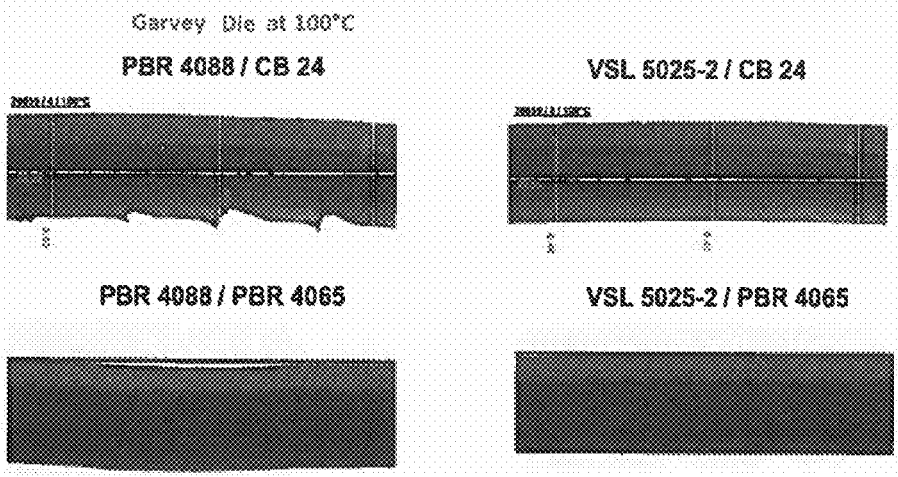
FIG. 3 shows Garvey die profiles of the extrudates formed from vulcanizates according to Examples 1-4 (numbering according to Table 6 in the examples) produced at 100° C.

FIG. 3 shows Garvey die profiles of the extrudates from Examples 1-4 (numbering according to Table 6 in the examples), produced at 100° C. The profiles of the vulcanizates based on modified NdBR (PBR 4065) show a smoother structure than the comparative extrudates based on unmodified NdBR (CB 24), which indicates better processing characteristics.

Figure 4:
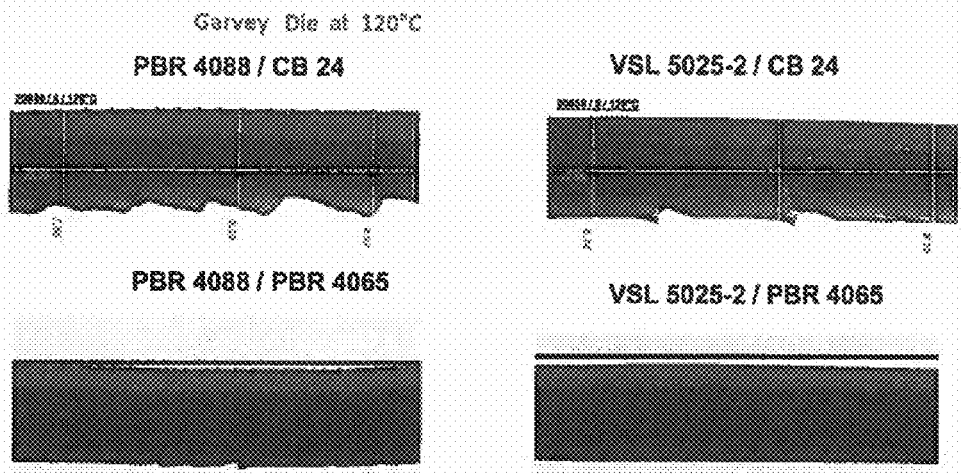
FIG. 4 shows Garvey die profiles of the extrudates formed from vulcanizates according to Examples 1-4 (numbering according to Table 6 in the examples) produced at 120° C.

FIG. 4 shows Garvey die profiles of the extrudates from Examples 1-4 (numbering according to Table 6 in the examples), produced at 120° C. Here too, the profiles of the vulcanizates based on modified NdBR (PBR 4065) show a smoother surface structure than the comparative extrudates based on unmodified NdBR (CB24).

Figure 5:
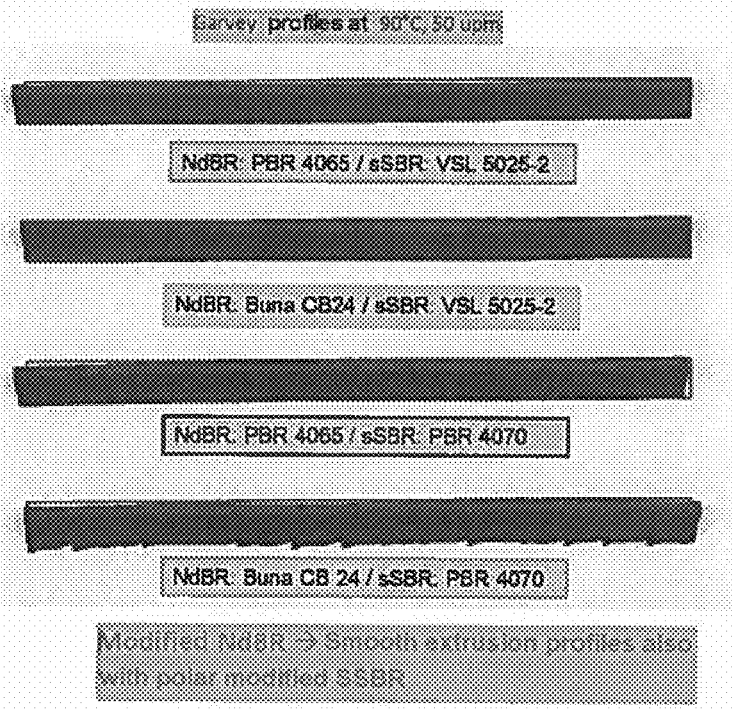
FIG. 5 shows Garvey die profiles of the extrudates formed from vulcanizates according to Examples 1, 2, 5 and 6 (numbering according to Table 6 in the examples) produced at 90° C.

FIG. 5 shows various Garvey die profiles of extrudates based on vulcanizates 1, 2, 5 and 6 (numbering according to Table 6 in the examples) produced at 90° C.

Here too, it is apparent that vulcanizates based on the inventive component b) (PBR 4065) have a smoother structure than the vulcanizates based on a noninventive component b) (Buna CB 24).

Figure 6:
FIG. 6 shows Garvey die profiles of extrudates formed from vulcanizates according to Examples 7 and 8 (numbering according to Table 6) produced at 100° C. or 120° C.
Figure 6:

FIG. 6 shows various Garvey die profiles of extrudates based on vulcanizates 7 and 8 (numbering according to Table 6 in the examples) produced at 100° C. and 120° C. On the basis of the smoother structure of the Garvey die profiles, an improvement in processibility is apparent here too through the use of inventive component b) in the form of modified NdBR PBR 4065 (rather than noninventive Buna CB 24) in combination with the inventive component a) in the form of end group-functionalized SSBR PBR 4078.

What is claimed is:

1. Vulcanizable rubber composition comprising:
   a) at least one functionalized polymer,
   b) at least one modified polybutadiene having a proportion of cis-1,4 units of >95% by weight and a 1,2-vinyl content of <1% by weight, the polybutadiene having been modified by means of sulphur chlorides after the polymerization,
   c) at least one silica,
   d) at least one further filler,
   e) at least one vulcanizing agent, and
   f) at least one oil.

2. The vulcanizable rubber composition according to claim 1, wherein the functionalized polymer comprises at least one of:
   functionalized diene polymers, and
   functionalized diene copolymers
obtained by copolymerization of dimes with vinylaromatic monomers.

3. The vulcanizable rubber composition according to claim 1, wherein the functionalized polymer is at least one of: a polybutadiene, a polyisoprene, a butadiene-isoprene copolymer, a butadiene-styrene copolymer, an isoprene-styrene copolymer and a butadiene-isoprene-styrene terpolymer.

4. The vulcanizable rubber composition according to claim 1, wherein:
   the functionalized polymer comprises end group-functionalized butadiene-styrene copolymers prepared by solution polymerization, wherein the end group-functionalized butadiene-styrene copolymers have Mooney viscosities (ML 1+4 (100° C.)) of 30 to 150 Mooney units, mean molar masses (number-average, Mn) of 100,000 to 1,000,000 g/mol, and glass transition temperatures of −110° C. to 0° C.; and
   the modified polybutadiene is obtained by solution polymerization in the presence of at least one inert organic solvent and in the presence of at least one catalyst based on neodymium compounds within a temperature range of −20° C. to 150° C., stopping the polymerization by adding protic compounds to produce polybutadiene, and modifying the polybutadiene with sulphur chlorides to increase the Mooney viscosity thereof, wherein the polybutadiene, before modification with the sulphur chlorides has a Mooney viscosity (ML 1+4 at 100° C.) of at least 20 MU, and the modified polybutadiene after the modification with the sulphur chlorides has a Mooney viscosity (ML 1+4 at 100° C.) of at least 30 MU.

5. The vulcanizable rubber composition according to claim 4, wherein:
   the polybutadiene, before modification with the sulphur chlorides has a Mooney viscosity (ML 1+4 at 100° C.) of at least 40 MU, and the modified polybutadiene after the modification with the sulphur chlorides has a Mooney viscosity (ML 1+4 at 100° C.) of 60-80 MU; and the composition comprises:
   a) 50 to 90 parts by weight of the at least one functionalized solution butadiene-styrene copolymer (SSBR),
   b) 10-50 parts by weight of the at least one modified polybutadiene (NdBR),
   c) 50-120 parts by weight of the at least one silica,
   d) 2-25 parts by weight of at least one further filler,
   e) 1-5 parts by weight of at least one vulcanizing agent, and
   f) 5-50 parts by weight of at least one oil,
where the parts by weight figures for components c)-f) are each based on 100 parts by weight of rubber (sum total of a) and b)).

6. The vulcanizable rubber composition according to claim 1, wherein the functionalized polymer comprises end group-functionalized butadiene-styrene copolymers prepared by solution polymerization.

7. The vulcanizable rubber composition according to claim 6, wherein the end group-functionalized butadiene-styrene copolymers have Mooney viscosities (ML 1+4 (100° C.)) of 10 to 200 Mooney units.

8. The vulcanizable rubber composition according to claim 7, wherein the end group-functionalized butadiene-styrene copolymers have mean molar masses (number-average, Mn) of 10,000 to 2,000,000 g/mol.

9. The vulcanizable rubber composition according to claim 8, wherein the end group-functionalized butadiene-styrene copolymers have glass transition temperatures of −110° C. to 20° C.

10. The vulcanizable rubber composition according to claim 1, wherein the modified polybutadiene is obtained by solution polymerization in the presence of at least one inert organic solvent and in the presence of at least one catalyst based on neodymium compounds within a temperature range of −20° C. to 150° C., stopping the polymerization by adding protic compounds, and modifying the polymer with sulphur chlorides to increase the Mooney viscosity thereof.

11. The vulcanizable rubber composition according to claim 10, wherein, prior to modifying the polymer with sulphur chlorides, the sulphur chlorides, are treated with a carboxylic add, fatty add and/or fatty add ester.

12. The vulcanizable rubber composition according to claim 11, wherein the sulphur chlorides are disulphur dichloride, sulphur chloride, sulphur bromide, sulphur dichloride, thionyl chloride, disulphur dibromide and/or thionyl bromide.

13. The vulcanizable rubber composition according to claim 12, wherein the modified polybutadiene, after modification with the sulphur chlorides, has a Mooney viscosity (ML 1+4 at 100° C.) at least 50% greeter than the Mooney viscosity (ML 1+4 at 100° C.) of the polybutadiene prior to modification with the sulphur chlorides.

14. The vulcanizable rubber composition according to claim 13, wherein the polybutadiene, before modification with the sulphur chlorides has a Mooney viscosity (ML 1+4 at 100° C.) of at least 20 MU, and the modified polybutadiene after the modification with sulphur chlorides has a Mooney viscosity (ML 1+4 at 100° C.) of at least 30 MU, and a gel content less than 1% by weight.

* * * * *